(12) United States Patent
Kimura

(10) Patent No.: US 9,041,968 B2
(45) Date of Patent: *May 26, 2015

(54) PRINT SYSTEM, PRINT SERVER, CONTROL METHOD THEREOF, AND PROGRAM

(71) Applicant: CANON KABUSHIKI KAISHA, Tokyo (JP)

(72) Inventor: Mitsuo Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/290,915

(22) Filed: May 29, 2014

(65) Prior Publication Data

US 2014/0268238 A1 Sep. 18, 2014

Related U.S. Application Data

(63) Continuation of application No. 13/965,052, filed on Aug. 12, 2013, now Pat. No. 8,755,065, which is a continuation of application No. 12/643,495, filed on Dec. 21, 2009, now Pat. No. 8,576,422.

(30) Foreign Application Priority Data

Jan. 6, 2009 (JP) .................................. 2009-001108

(51) Int. Cl.
*G06F 3/12* (2006.01)
*G06K 15/00* (2006.01)

(52) U.S. Cl.
CPC ............ *G06F 3/1272* (2013.01); *G06F 3/1204* (2013.01); *G06F 3/1226* (2013.01);
(Continued)

(58) Field of Classification Search
USPC ............... 358/1.15, 1.1, 1.14, 1.18, 1.6, 1.16, 358/3.23, 403, 434, 442, 462, 476, 448, 358/426.05, 508, 1
See application file for complete search history.

(56) References Cited

U.S. PATENT DOCUMENTS 5,303,336 A 4/1994 Kageyama et al.
6,301,012 B1 * 10/2001 White et al. ................. 358/1.15
(Continued)

FOREIGN PATENT DOCUMENTS

CN 1317768 A 10/2001
CN 1402117 A 3/2003
(Continued)

OTHER PUBLICATIONS

Wikipedia Encyclopieda, Print Server, Mar. 2009, Wikedia Encyclopedia, all pages.

(Continued)

*Primary Examiner* — Ngon Nguyen
(74) *Attorney, Agent, or Firm* — Fitzpatrick, Cella, Harper & Scinto

(57) ABSTRACT

A client terminal transmits a request to a printing apparatus for a registration web page for registering, in a print server, a printing apparatus used in a print service provided by the print server. The printing apparatus collects configuration information of the printing apparatus in response to reception of the request, and creates link information which contains the collected configuration information and is used to access the print server. The printing apparatus then generates a registration web page containing the created link information, and transmits it to the client terminal. The print server receives the configuration information of the printing apparatus transmitted from the client terminal via the registration web page transmitted to the client terminal. The print server creates printing apparatus information which associates the configuration information with user information of the user of the client terminal, and manages it in a storage medium.

7 Claims, 16 Drawing Sheets

(52) U.S. Cl.
CPC ............ *G06F3/1228* (2013.01); *G06F 3/1287* (2013.01); *G06F 3/1293* (2013.01); *G06K 15/4095* (2013.01); *G06F 3/1203* (2013.01)

(56) References Cited

U.S. PATENT DOCUMENTS

| | | | |
|---|---|---|---|
| 6,545,767 | B1 | 4/2003 | Kuroyanagi |
| 7,359,075 | B2 | 4/2008 | Kimura |
| 7,460,261 | B2 | 12/2008 | Itoh |
| 8,755,065 | B2 * | 6/2014 | Kimura .................. 358/1.14 |
| 2003/0081250 | A1 | 5/2003 | Kimura |
| 2003/0107761 | A1 | 6/2003 | Kimura |
| 2004/0138964 | A1 | 7/2004 | Okada et al. |
| 2004/0143651 | A1 | 7/2004 | Allen et al. |
| 2004/0190049 | A1 * | 9/2004 | Itoh .............................. 358/1.15 |
| 2005/0007627 | A1 | 1/2005 | Ha |
| 2006/0026437 | A1 | 2/2006 | Sumio |
| 2006/0149970 | A1 | 7/2006 | Imazu |
| 2006/0197980 | A1 | 9/2006 | Kanbara |
| 2007/0028236 | A1 | 2/2007 | Williams, II |
| 2007/0083629 | A1 | 4/2007 | Sugishita |
| 2007/0086051 | A1 | 4/2007 | Kunori |
| 2007/0127053 | A1 | 6/2007 | Tominaga |
| 2007/0146778 | A1 | 6/2007 | Kitagata et al. |
| 2007/0233687 | A1 * | 10/2007 | Iwase ................................ 707/9 |
| 2007/0273923 | A1 | 11/2007 | Kimura |
| 2008/0141167 | A1 * | 6/2008 | Kubo et al. ................... 715/796 |
| 2008/0263546 | A1 | 10/2008 | Yoshimura et al. |
| 2010/0118334 | A1 | 5/2010 | Iwase |

FOREIGN PATENT DOCUMENTS

| | | |
|---|---|---|
| JP | 2003-280856 A | 10/2003 |
| JP | 2003-303077 A | 10/2003 |
| KR | 10-2004-0039304 A | 10/2004 |
| KR | 10-2005-0006492 A | 1/2005 |

OTHER PUBLICATIONS

Kenichi, Remote Print System, Printer Registration Method, Recording Medium and Program, Oct. 2003, Machine Translation Japanese Patent Application, JP 2003-303077, all pages.

* cited by examiner http://www.ganon.co.jp/print-service/forwardprinterinsert.do
?address=172.24.93.181&model=LBP5900&duplex=yes&cassette=1,2,manual&box=no

FIG. 12

| PRINTER SETTINGS | EXECUTE |
|---|---|
| PRINTER NAME : | |
| DEVICE ADDRESS : | 172.24.93.181 |
| DEVICE MODEL : | LBP5900 |
| DOUBLE-SIDED PRINTING FUNCTION : | ON |
| PAPER FEED CASSETTE : | CASSETTE 1 |
| | CASSETTE 2 |
| | MANUAL FEED |
| BOX STORAGE FUNCTION : | OFF |
| PDF PRINTING FUNCTION : | ON |

PRINT SYSTEM, PRINT SERVER, CONTROL METHOD THEREOF, AND PROGRAM

This application is a continuation of U.S. application Ser. No. 13/965,052, filed Aug. 12, 2013 (pending), which is a continuation of U.S. application Ser. No. 12/643,495, filed Dec. 21, 2009, now U.S. Pat. No. 8,576,422, issued Nov. 5, 2013, the contents of which are incorporated herein by reference.

BACKGROUND OF THE INVENTION

1. Field of the Invention

The present invention relates to a print system which is configured by connecting a client terminal, print server, and printing apparatus to a network and manages printing from the client terminal, a print server, a control method thereof, and a program.

2. Description of the Related Art

In an improved network environment including a low communication cost thanks to broadband communication, SaaS (Software as a Service), which provides a software function as a service via the Internet, is increasingly becoming popular. SaaS has become a business model for providing a software function as a "service" via the Internet and gaining an income as a monthly usage fee, unlike conventional "licensing" of selling packet software and earning an income. SaaS is one field of "Cloud Computing".

Even a print system which has conventionally managed printers and print jobs on a network in a local area such as an office needs to cope with SaaS as an Internet print service.

In addition to SaaS, a thin client having only a Web browser (client which uses only server-side programs and does not use client-side programs) is expected to prevail. According to SaaS, software such as an application need not be installed in a terminal such as a personal computer functioning as a client. The introduction of a thin client is therefore very advantageous to users, considering reduction of the management cost of software distributed to a client and a measure against leakage of information because no data is saved in a client. It is also a challenge for print systems to deal with SaaS thin clients.

Printers managed by a print system generally differ from each other in functions and specifications, so the user needs to register configuration information of a printer in the server (print server) of the print system in advance. Based on the registered configuration information, the print server provides a user interface for setting print attributes by the user in printing, a function of tracking a print job till the completion of printing, and the like.

As a method of registering printer configuration information by a user, he generally directly inputs it to a user interface provided by a print system to register a printer. According to this method, the user needs to grasp all pieces of configuration information of a printer. When there are many configuration information items to be input, the input is cumbersome. Hence, a terminal manipulated by the user is sometimes provided with a program for automating registration of printer configuration information. This program provides a function of acquiring configuration information from a printer and registering it in the print server.

There is proposed a method of accessing a printer directly by a print server and acquiring printer configuration information (see, e.g., Japanese Patent Laid-Open No. 2003-303077). There is also proposed a method of registering configuration information in a print server by a printer itself (see, e.g., Japanese Patent Laid-Open No. 2003-280856).

However, considering a form in which services are provided via the Internet, a problem arises when applying the conventional technique in the method of registering printer configuration information in a print system.

For example, when a program running on a terminal which designates registration of printer configuration information acquires printer configuration information and registers it in a print server, software other than a Web browser does not run on a thin client terminal in the thin client environment. Thus, software on the thin client terminal cannot acquire printer configuration information to register it in the print server.

When directly acquiring printer configuration information from a print server, the print server needs to access the printer. In general, a firewall does not permit access to a local area printer from the Internet (outside the local area), so it may be impossible to acquire printer configuration information.

When providing a service via the Internet, it is essential to manage users for security. More specifically, when receiving a service provided by a print system, the user enters his user ID and password to a login dialog (screen) provided by the print system, and the print system authenticates him. Also when registering printer configuration information, the print system recognizes that an authenticated user is to register it, and permits him to use the printer. The user can use the printer immediately after registering the printer configuration information.

When the printer directly registers its configuration information in the print server, the print server cannot recognize a user who has registered it. The print server separately requires a procedure to permit the user to use the registered printer, impairing user friendliness. As another method, it is also possible to allow the user to enter authentication information such as the user ID and password to a printer, which will then register configuration information in the print server together with the entered authentication information. However, it leads to poor security to transfer authentication information such as the user ID and password temporarily to the printer and then to the print server in order to log in to the print system.

SUMMARY OF THE INVENTION

The present invention has been made to solve the above-described problems. The present invention provides a print system, a print server, a control method thereof, and a program capable of easily, safely registering printer configuration information in a service provider in an environment in which a service for providing the printing function is utilized.

According to the first aspect of the present invention, a print system which is configured by connecting a client terminal, a print server, and a printing apparatus to a network and manages printing from the client terminal, the client terminal comprises: a request transmission unit adapted to transmit a request to the printing apparatus for a registration web page for registering, in the print server, a printing apparatus used in a print service provided by the print server, the printing apparatus comprises: a collection unit adapted to collect configuration information of the printing apparatus in response to reception of the request from the client terminal; a creation unit adapted to create link information which contains the configuration information collected by the collection unit and is used to access the print server; and a transmission unit adapted to generate the registration web page containing the link information created by the creation unit and transmit the registration web page to the client terminal, and the print server comprises: a reception unit adapted to receive the configuration information of the printing apparatus transmitted from the client terminal via the registration web page transmitted to the client terminal; and a printing apparatus management unit adapted to create printing apparatus information which associates the configuration information received by the reception unit with user information of a user of the client terminal, and manage the printing apparatus information in a storage medium.

According to the second aspect of the present invention, a print server which is connected to a client terminal and a printing apparatus via a network and manages printing from the client terminal, the print server comprises: a reception unit adapted to receive configuration information of the printing apparatus transmitted from the client terminal via a registration web page which is transmitted from the printing apparatus to the client terminal to register, in the print server, a printing apparatus used in a print service provided by the print server; an authentication unit adapted to authenticate a user of the client terminal; and a printing apparatus management unit adapted to create printing apparatus information which associates the configuration information received by the reception unit with user information of a user successfully authenticated by the authentication unit, and manage the printing apparatus information in a storage medium.

According to the third aspect of the present invention, a method of controlling a print server which is connected to a client terminal and a printing apparatus via a network and manages printing from the client terminal, the method comprises: receiving configuration information of the printing apparatus transmitted from the client terminal via a registration web page which is transmitted from the printing apparatus to the client terminal to register, in the print server, a printing apparatus used in a print service provided by the print server; authenticating a user of the client terminal; and creating printing apparatus information which associates the configuration information received in the receiving step with user information of a user successfully authenticated in the authenticating step, thereby managing the printing apparatus information in a storage medium.

According to the fourth aspect of the present invention, a program, which is stored in a storage medium, for causing a computer to control a print server which is connected to a client terminal and a printing apparatus via a network and manages printing from the client terminal, the program causes the computer to execute receiving configuration information of the printing apparatus transmitted from the client terminal via a registration web page which is transmitted from the printing apparatus to the client terminal to register, in the print server, a printing apparatus used in a print service provided by the print server, authenticating a user of the client terminal, and creating printing apparatus information which associates the configuration information received in the receiving step with user information of a user successfully authenticated in the authenticating step, thereby managing the printing apparatus information in a storage medium.

Further features of the present invention will be apparent from the following description of exemplary embodiments with reference to the attached drawings.

BRIEF DESCRIPTION OF THE DRAWINGS

FIG. 12 is a view showing the dialog (screen) of a printer registration page for registering a printer in the print service according to the embodiment of the present invention;

DESCRIPTION OF THE EMBODIMENTS

An embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

A print system will be described as a premise of the present invention.

Figure 1:
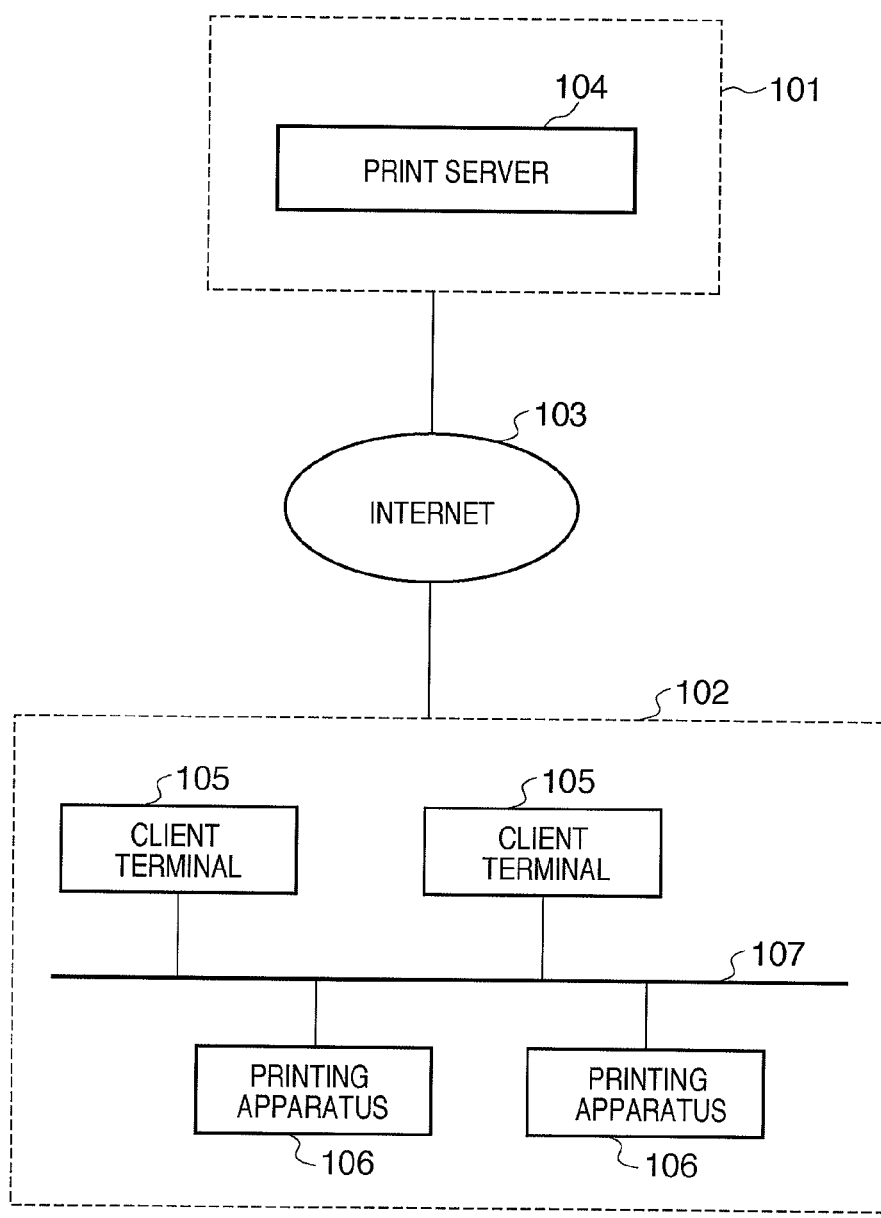
FIG. 1 is a block diagram showing the overall configuration of a print system according to an embodiment of the present invention.

FIG. 1 is a block diagram showing the overall configuration of a print system according to the embodiment of the present invention.

Referring to FIG. 1, a print service site 101 provides a print service via the Internet. A print server 104 configures (implements) the print service site 101. A local area 102 is, for example, an office. Client terminals 105 and printing apparatuses 106 in the local area 102 are connected to each other via an intranet 107. FIG. 1 shows only two client terminals 105 and two printing apparatuses 106 for illustrative convenience, but n client terminals 105 and n printing apparatuses 106 are also assumed to be connected. The print service site 101 and local area 102 are connected via the Internet 103.

Figure 2:
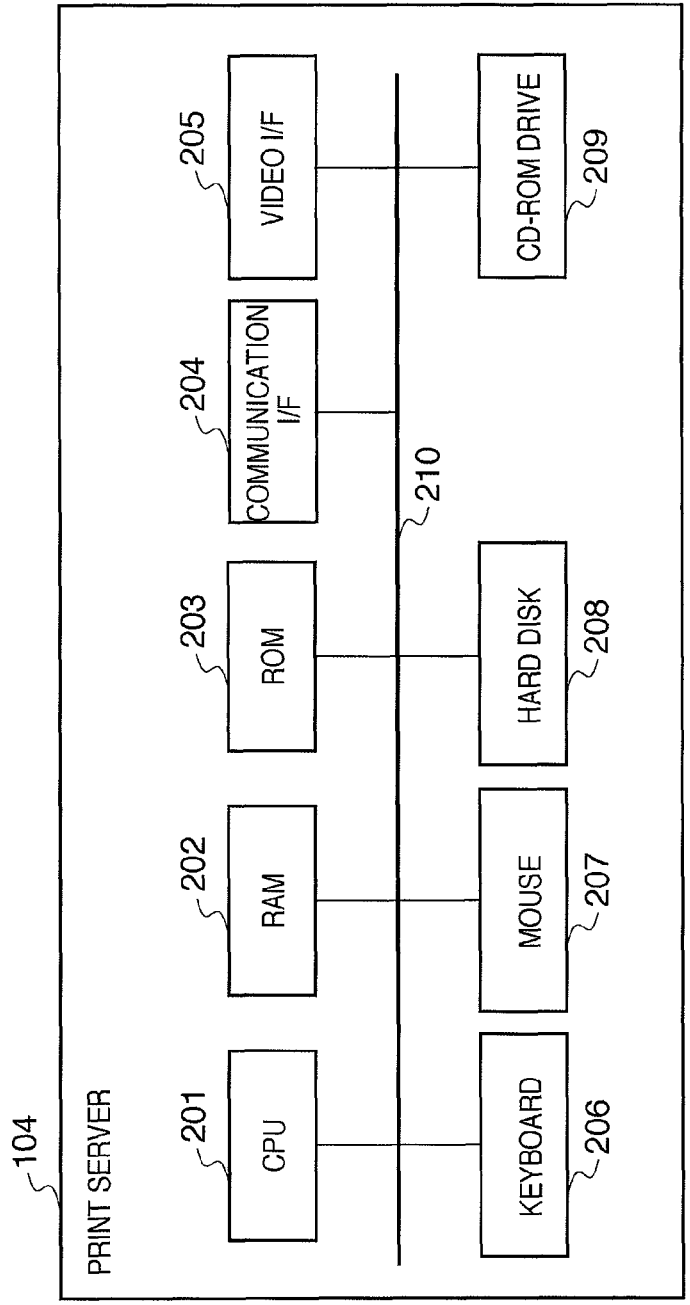
FIG. 2 is a block diagram showing the basic hardware configuration of a print server according to the embodiment of the present invention.

FIG. 2 is a block diagram showing the basic hardware configuration of the print server according to the embodiment of the present invention.

The print server 104 includes a CPU 201, a RAM 202, a ROM 203, a communication interface 204, a video interface 205, a keyboard 206 and mouse 207 functioning as an input unit, a hard disk 208, and a CD-ROM drive 209. These building components of the print server 104 are connected to each other via a system bus 210. The system bus 210 is formed from, for example, a PCI bus, AGP bus, or memory bus.

Note that FIG. 2 does not illustrate a connection chip between buses, a keyboard interface, and an input/output interface such as a so-called SCSI or ATAPI interface.

The CPU 201 performs various calculations such as four arithmetic operations and comparison operation, and hardware control based on an operating system (OS) program and application programs. The RAM 202 stores an operating system program, application programs, and the like read out from the hard disk 208 and a storage medium such as a CD-ROM or CD-R mounted on the CD-ROM drive 209. The CPU 201 executes these programs.

The ROM 203 stores a so-called BIOS and the like which control input/output of data to/from the hard disk 208 in cooperation with the operating system. The communication interface 204 communicates with an external device connected via a network in cooperation with the communication program of the operating system controlled by the CPU 201. The video interface 205 generates an image signal to be output to a display device. The keyboard 206 and mouse 207 are used to input an instruction to the print server 104.

The hard disk 208 stores an OS and application programs (e.g., a print system program for practicing the present invention).

The CD-ROM drive 209 is used to mount a storage medium such as a CD-ROM, CD-R, or CD-R/W and install an application program in the hard disk 208. Instead of the CD-ROM drive, a drive for another type of storage medium is also available, including a CD-R drive, CD-R/W drive, or DVD drive.

Figure 3:
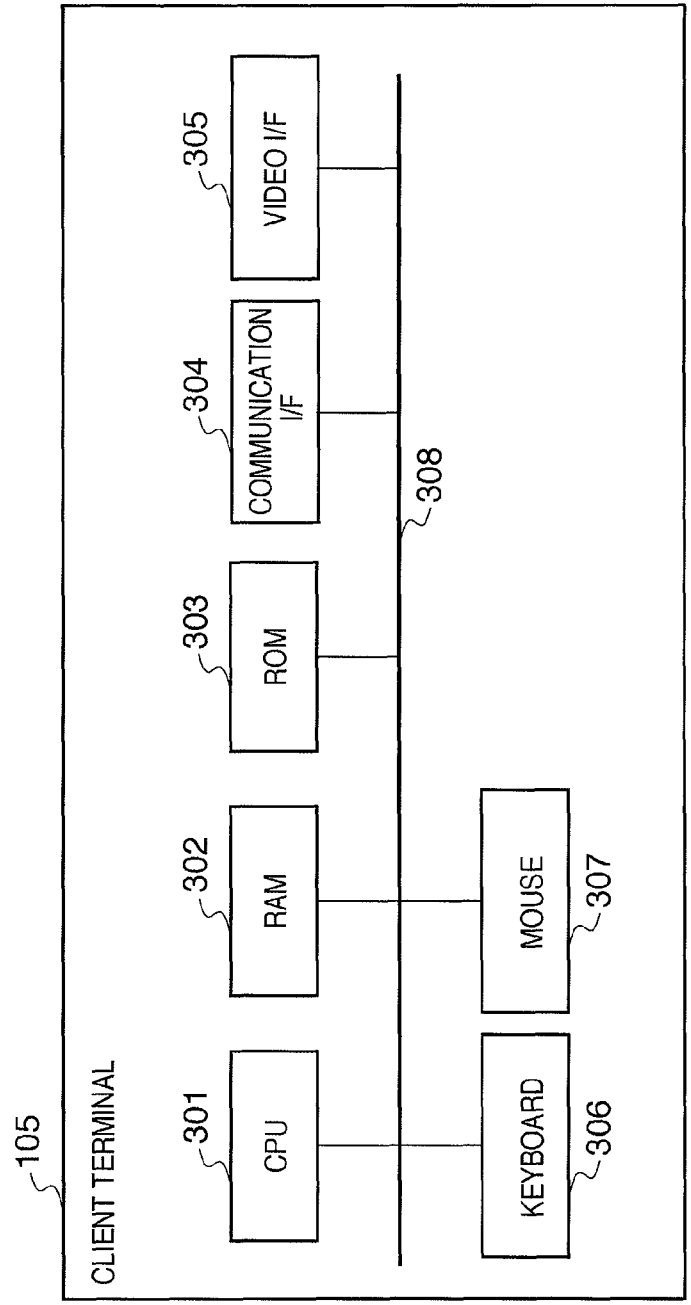
FIG. 3 is a block diagram showing the basic hardware configuration of a client terminal according to the embodiment of the present invention.

FIG. 3 is a block diagram showing the basic hardware configuration of the client terminal according to the embodiment of the present invention.

The client terminal 105 includes a CPU 301, a RAM 302, a ROM 303, a communication interface 304, a video interface 305, and a keyboard 306 and mouse 307 serving as an input unit. These building components of the client terminal 105 are connected to each other via a system bus 308. The system bus 308 is formed from, for example, a PCI bus, AGP bus, or memory bus.

Note that FIG. 3 does not illustrate a connection chip between buses, a keyboard interface, and an input/output interface such as a so-called SCSI or ATAPI interface.

The CPU 301 performs various calculations such as four arithmetic operations and comparison operation, and hardware control based on an operating system (OS) program and application programs.

The ROM 303 stores an operating system, Web browser program, and the like. The communication interface 304 communicates with an external device connected via a network in cooperation with the communication program of the operating system controlled by the CPU 301. The RAM 302 stores data and the like downloaded via the communication interface 304. The video interface 305 generates an image signal to be output to a display device. The keyboard 306 and mouse 307 are used to input an instruction to the client terminal 105.

Figure 4:
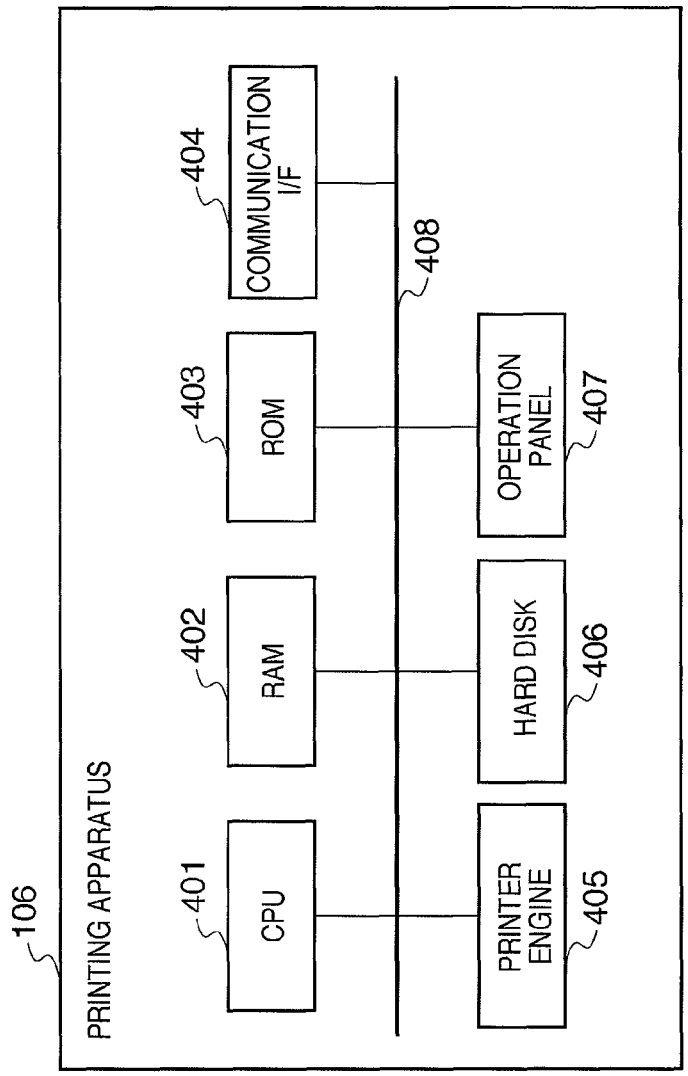
FIG. 4 is a block diagram showing the basic hardware configuration of a printing apparatus according to the embodiment of the present invention.

FIG. 4 is a block diagram showing the basic hardware configuration of the printing apparatus according to the embodiment of the present invention.

The printing apparatus 106 includes a CPU 401, RAM 402, ROM 403, communication interface 404, printer engine 405, hard disk 406, and operation panel 407. These building components of the printing apparatus 106 are connected to each other via a system bus 408.

By using the RAM 402 as a work memory, the CPU 401 executes software stored in the hard disk 406. The CPU 401 sets the operation of the printing apparatus 106 in accordance with a user instruction input from the operation panel 407. The CPU 401 generates image data based on print data such as PDL data input from an external device via the communication interface 404, and supplies the image data to the printer engine 405, thereby printing. The ROM 403 stores a so-called BIOS and the like which control input/output of data to/from the hard disk 406.

Figure 5:
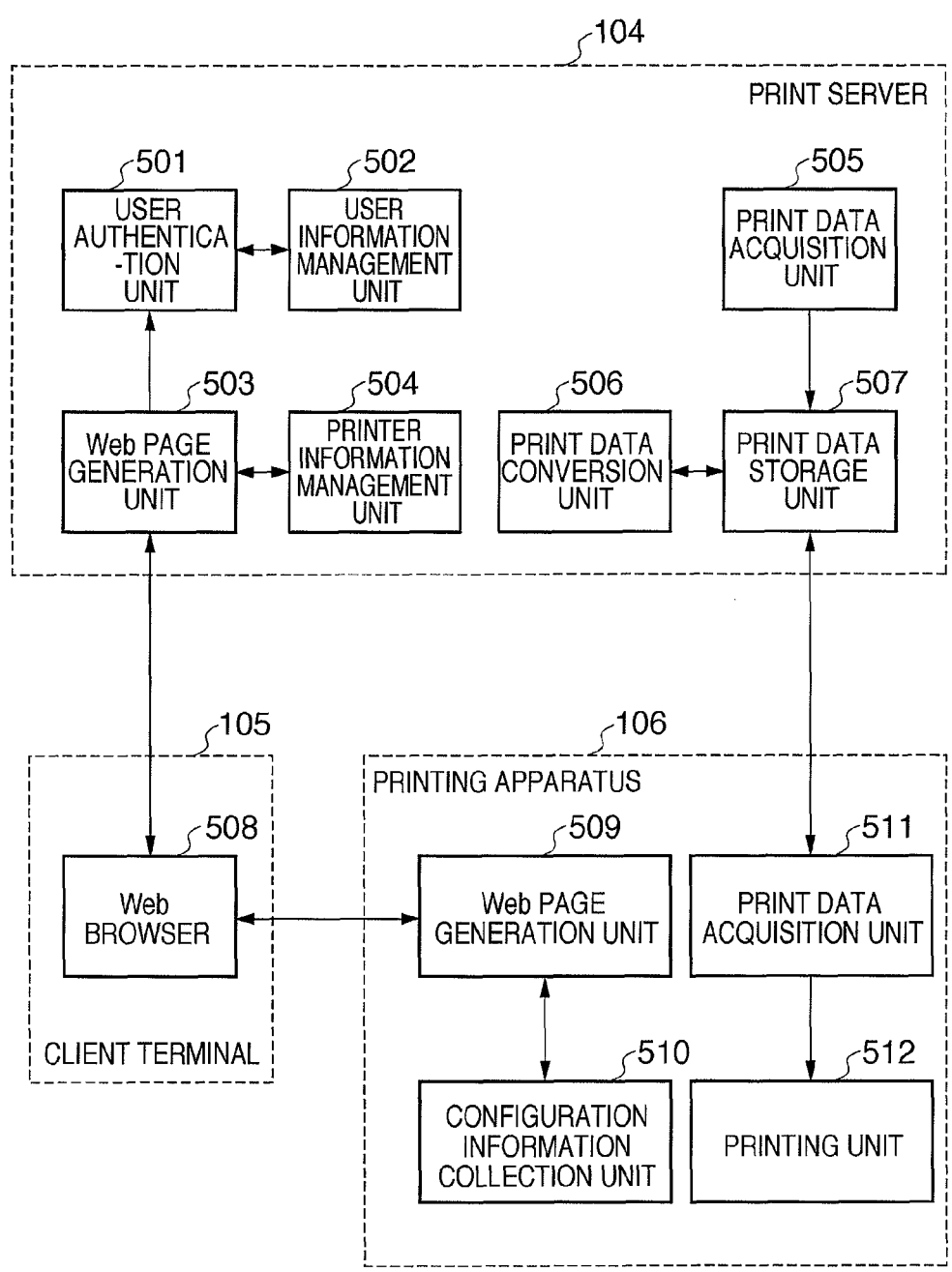
FIG. 5 is a block diagram showing the functional arrangements of the print server, client terminal, and printing apparatus in the print system according to the embodiment of the present invention.

FIG. 5 is a block diagram showing the functional arrangements of the print server, client terminal, and printing apparatus in the print system according to the embodiment of the present invention.

The print server 104 includes a Web page generation unit 503 which generates a Web page for responding to a request from the client terminal 105. The Web page generation unit 503 generates a variety of operation screens for providing the print service to the client terminal 105. These operation screens are, for example, a printing apparatus list including a list of printing apparatuses the use of which is permitted to a user and a list of printing apparatuses capable of printing target print data, and a print setting dialog (screen) for printing apparatuses registered in a client terminal. That is, the Web page generation unit 503 has a printing apparatus list creation function and print setting dialog (screen) creation function.

The print server 104 also includes a user information management unit 502 which manages user information, and a user authentication unit 501 which performs user authentication based on user information managed by the user information management unit 502.

The print server 104 includes a printer information management unit 504 which creates and manages printer information (printing apparatus information) that associates user information of a user authenticated by the user authentication unit 501 with configuration information of the printing apparatus 106 received from the client terminal. That is, the print server 104 has a printing apparatus management function of managing printing apparatus information serving as printer information.

Further, the print server 104 includes a print data acquisition unit 505 which acquires print data from an external service via the communication interface 304, and a print data storage unit 507 which stores the acquired print data. The print server 104 also includes a print data conversion unit 506 which, if necessary, converts acquired print data into a format suited to the printing apparatus 106.

The client terminal 105 includes a Web browser 508 which transmits a request to the print server 104 or printing apparatus 106 via the communication interface 304 and displays a Web page sent back as a response. That is, the client terminal has a request transmission function and Web page browsing function.

The printing apparatus 106 includes a Web page generation unit 509 which generates a Web page to respond to a request from the client terminal 105, and a configuration information collection unit 510 which collects configuration information of the printing apparatus 106. The printing apparatus 106 also includes a print data acquisition unit 511 which downloads print data from the print server 104 via the communication interface 404, and a printing unit 512 which prints by supplying the acquired print data to the printer engine 405.

Figure 6:
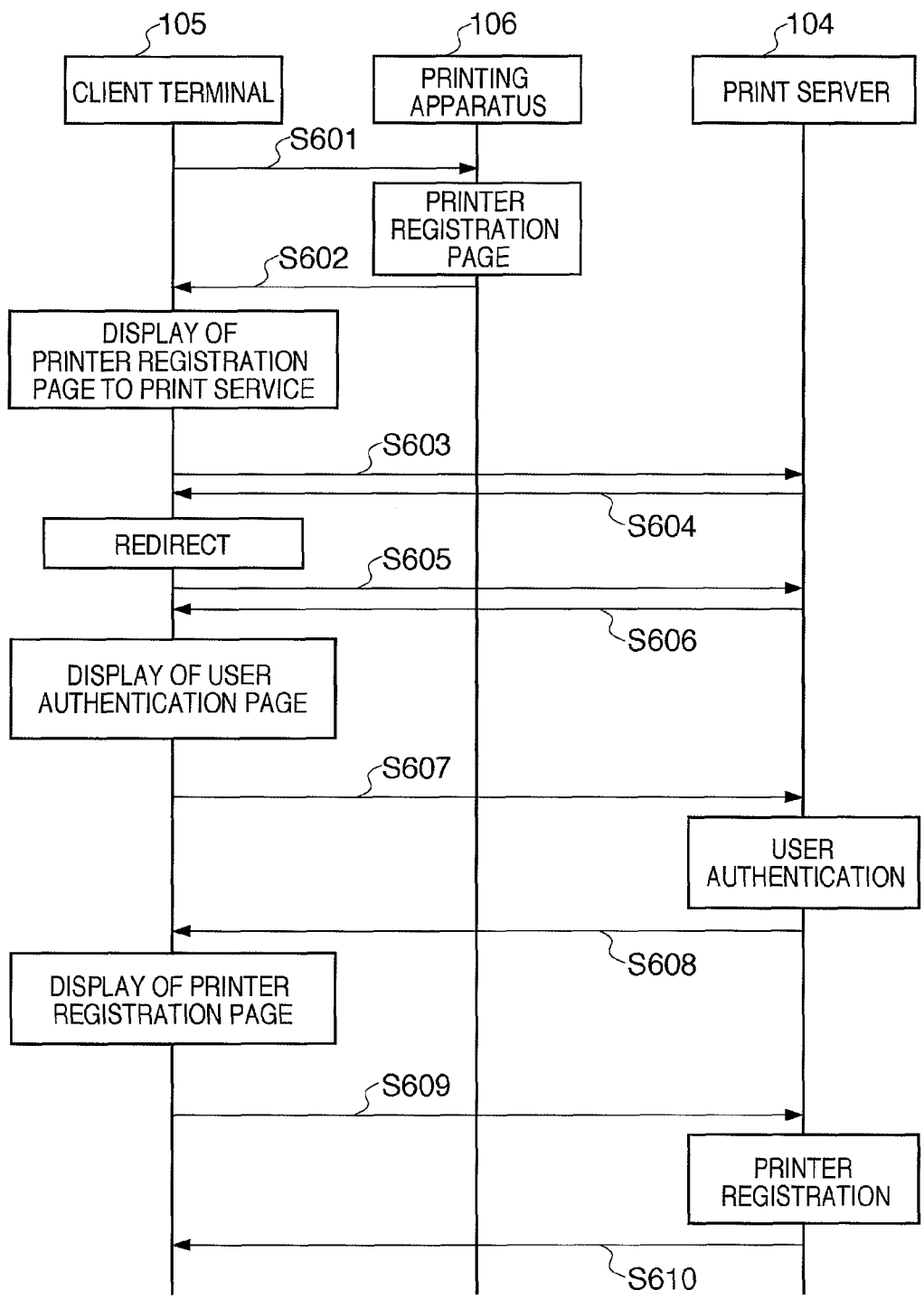
FIG. 6 is a chart showing the sequence of processing until the printing apparatus is registered in the print server in accordance with an instruction from the client terminal according to the embodiment of the present invention.

FIG. 6 is a chart showing the sequence of processing until the printing apparatus is registered in the print server in accordance with an instruction from the client terminal according to the embodiment of the present invention.

The Web browser 508 of the client terminal 105 accepts a user instruction and transmits a request to the printing apparatus 106 for a printer registration page (registration dialog (screen)) to the print service (S601).

Upon receiving the printer registration page request, the printing apparatus 106 causes the Web page generation unit 509 to generate the URL of the printer registration page to the print server in which configuration information of the printing apparatus 106 collected by the configuration information collection unit 510 is set as a parameter. An example of this URL is a URL 1003 in FIG. 10. The printing apparatus 106 sends back, to the client terminal 105, a Web page, for example, a printer registration page 1001 in FIG. 10 in which the URL is embedded as, e.g., a hyperlink 1002 in FIG. 10 (S602).

The configuration information of the printing apparatus 106 contains, for example, a device address, a device model, the presence/absence of a double-sided printing function, a paper feed cassette list, the presence/absence of a box storage function, and that of a PDF printing function.

The Web browser 508 of the client terminal 105 displays the Web page (printer registration page) sent back from the printing apparatus 106. The Web browser 508 of the client terminal 105 accepts a user instruction via the Web page and then transmits a request to the print server 104 for a Web page indicated by the URL of the printer registration page that is set in the hyperlink (S603). This user instruction is, for example, clicking of the hyperlink of the Web page.

Figure 11:
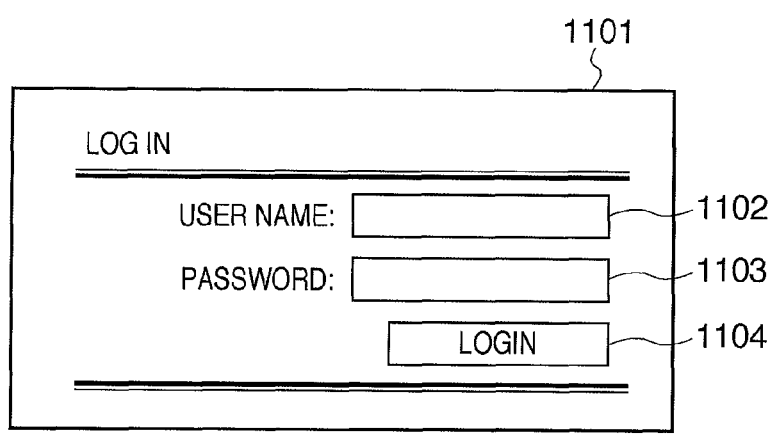
FIG. 11 is a view showing the dialog (screen) of a user authentication page to the print service according to the embodiment of the present invention.

Upon receiving the Web page request, the Web page generation unit 503 of the print server 104 determines that the request has not come from an authenticated user, and sends back a redirect request as a response for, for example, a user authentication page 1101 in FIG. 11 (S604).

Upon receiving the redirect request as a response, the Web browser 508 of the client terminal 105 transmits a request to the print server 104 for a user authentication page at the redirect destination (S605).

Upon receiving the user authentication page request, the Web page generation unit 503 of the print server 104 sends back a user authentication page to the client terminal 105 (S606).

The Web browser 508 of the client terminal 105 displays the user authentication page sent back from the print server 104. The Web browser 508 of the client terminal 105 accepts a user instruction via the user authentication page and transmits a user authentication request to the print server 104 (S607). This user instruction is, for example, input of a user name and password and clicking of a login button. The user authentication request contains the input user name and password.

Upon receiving the user authentication request, the print server 104 causes the user authentication unit 501 to execute user authentication based on user information managed by the user information management unit 502. If the authentication is successful, the print server 104 causes the Web page generation unit 503 to generate, for example, a printer registration page 1201 in FIG. 12, the request of which has been accepted in S603. The print server 104 transmits the printer registration page as a response to the client terminal 105 (S608).

The Web browser 508 of the client terminal 105 displays the printer registration page sent back from the print server 104. The Web browser 508 of the client terminal 105 accepts a user instruction (input of a printer name and clicking of an execution button) via the printer registration page, and transmits a printer registration request to the print server 104 (S609).

Upon receiving the printer registration request, the print server 104 causes the printer information management unit 504 to perform printer registration processing. The print server 104 causes the Web page generation unit 503 to generate a Web page in which a message that the printer has been registered successfully is embedded. The print server 104 sends back the Web page as a response to the client terminal 105 (S610).

Figure 7:
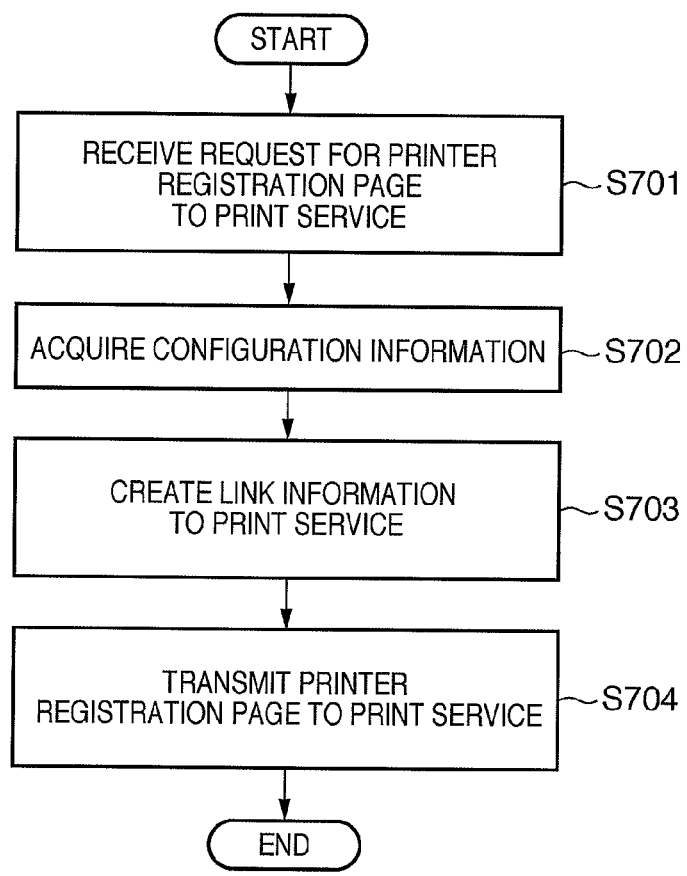
FIG. 7 is a flowchart showing the sequence of processing by the printing apparatus in printer registration processing of FIG. 6 according to the embodiment of the present invention.

FIG. 7 is a flowchart showing the sequence of processing by the printing apparatus in the printer registration processing of FIG. 6 according to the embodiment of the present invention.

In step S701, the printing apparatus 106 receives a request from the client terminal 105 for a printer registration page to the print service. In step S702, the configuration information collection unit 510 acquires configuration information of the printing apparatus 106.

In step S703, the Web page generation unit 509 creates link information serving as the URL 1003 (FIG. 10) of the printer registration page to the print server in which the acquired configuration information is set as a parameter. In step S704, the printing apparatus 106 transmits, to the client terminal 105, the Web page, that is, printer registration page 1001 in FIG. 10 in which the generated URL is embedded as the hyperlink 1002 in FIG. 10. After that, the process ends.

Figure 8:
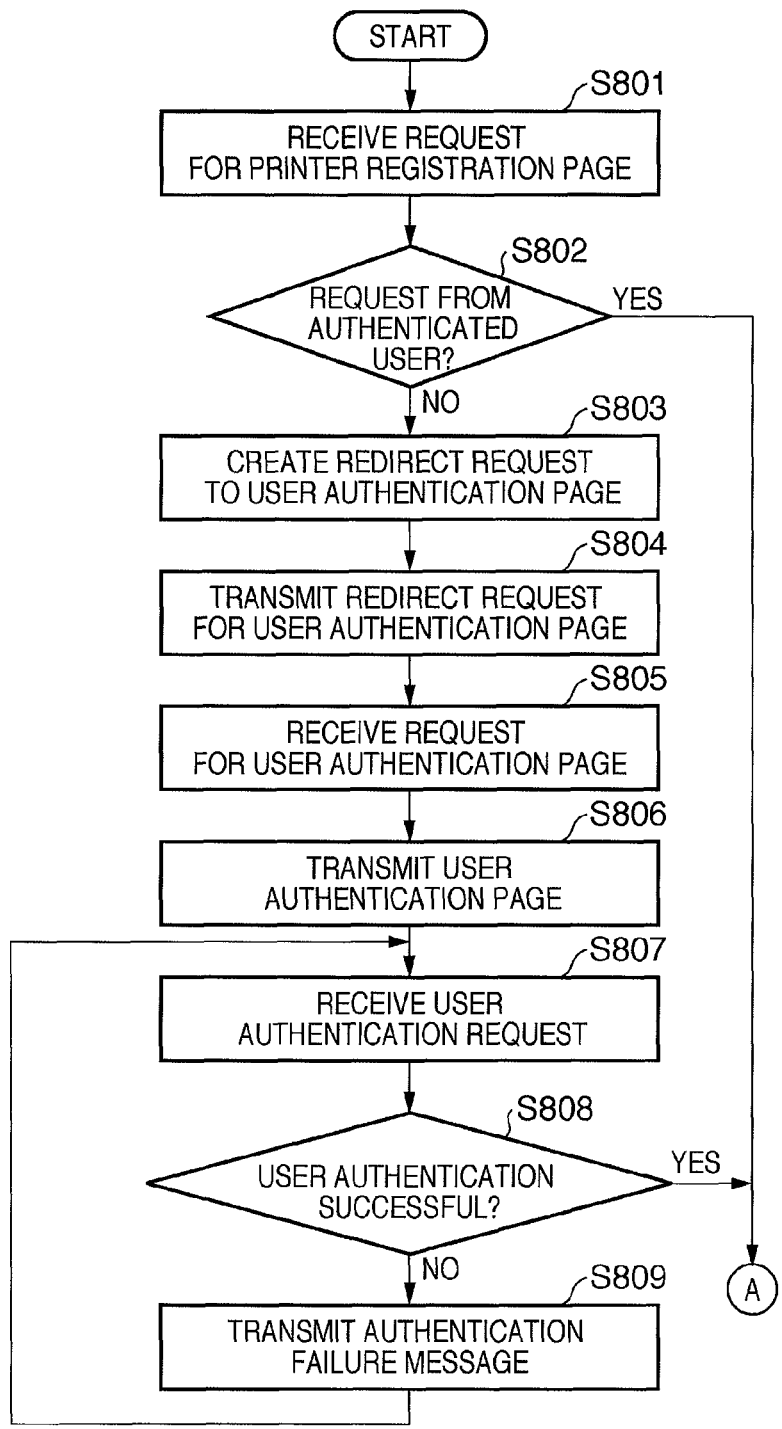
FIG. 8 is a flowchart showing the sequence of processing by the print server in the printer registration processing of FIG. 6 according to the embodiment of the present invention.
Figure 9:
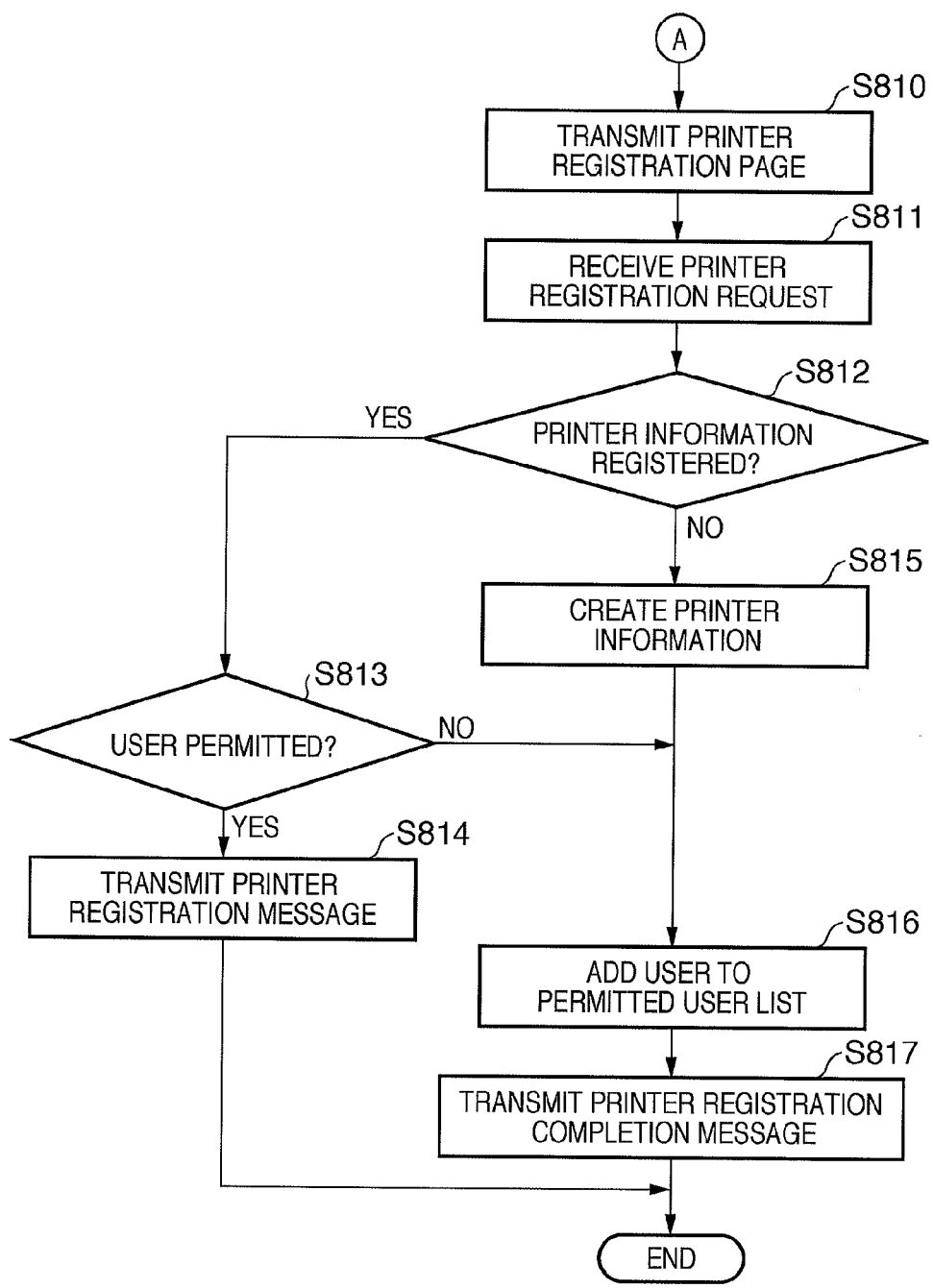
FIG. 9 is a flowchart showing the sequence of processing by the print server in the printer registration processing of FIG. 6 according to the embodiment of the present invention.

FIGS. 8 and 9 are flowcharts showing the sequence of processing by the print server in the printer registration processing of FIG. 6 according to the embodiment of the present invention.

In step S801, the print server 104 receives a request from the client terminal 105 for a printer registration page. In step S802, the Web page generation unit 503 determines whether the request has come from an authenticated user.

If the Web page generation unit 503 determines that the request has come from an authenticated user (YES in step S802), the process advances to step S810. If the Web page generation unit 503 determines that the request has not come from an authenticated user (NO in step S802), it creates a redirect request for the user authentication page 1101 in FIG. 11 in step S803. In step S804, the print server 104 transmits the redirect request to the client terminal 105.

In step S805, the Web page generation unit 503 receives a request from the client terminal 105 for the user authentication page. In step S806, the Web page generation unit 503 transmits the user authentication page to the client terminal 105.

In step S807, the print server 104 receives a user authentication request from the client terminal 105. Then, the user authentication unit 501 executes user authentication based on user information managed by the user information management unit 502. By performing the user authentication, registration of a printer by a user who is not managed in the print service can be prevented.

In step S808, the user authentication unit 501 determines whether the user authentication is successful. If the user authentication unit 501 determines that the user authentication has failed (NO in step S808), the process advances to step S809. In step S809, the Web page generation unit 503 generates a Web page in which a message (authentication failure message) that the authentication has failed is embedded. The Web page generation unit 503 transmits the Web page to the client terminal 105, and then the process returns to step S807.

If the user authentication unit 501 determines that the user authentication is successful (YES in step S808), the process advances to step S810. In step S810, the Web page generation unit 503 creates a printer registration page 1201 in FIG. 12 which has been requested in step S801 and reflects the parameter of configuration information set in the URL. The Web page generation unit 503 transmits the printer registration page to the client terminal 105.

In step S811, the print server 104 receives a printer registration request from the client terminal 105. In step S812, the printer information management unit 504 determines whether printer information has already been registered.

If the printer information management unit 504 determines that no printer information has been registered yet (NO in step S812), the process advances to step S815. In step S815, the printer information management unit 504 creates printer information (FIG. 13) based on the configuration information reflected in the printer registration page. The printer information management unit 504 adds the user ID of the user authenticated in step S807 to a permitted user list in the created printer information. Accordingly, the printer information is created as printing apparatus information which associates the user ID serving as user information with the configuration information of the printing apparatus.

In step S817, the Web page generation unit 503 generates a Web page in which a message (printer registration completion message) that registration of the printer is complete is embedded. The Web page generation unit 503 transmits the Web page to the client terminal 105, and then the process ends.

If the printer information management unit 504 determines that printer information has already been registered (YES in step S812), the process advances to step S813. In step S813, the printer information management unit 504 confirms the permitted user list in the printer information, and determines whether the user ID of the user authenticated in step S807 exists in the list. That is, the printer information management unit 504 determines whether the user has been permitted. If the printer information management unit 504 determines that this user ID does not exist in the list (NO in step S813), the process advances to step S816.

If the printer information management unit 504 determines that this user ID exists in the list (YES in step S813), the process advances to step S814. In step S814, the Web page generation unit 503 generates a Web page in which a message (printer registration message) that the printer has already been registered is embedded. The Web page generation unit 503 transmits the Web page to the client terminal 105, and then the process ends.

Figure 10:
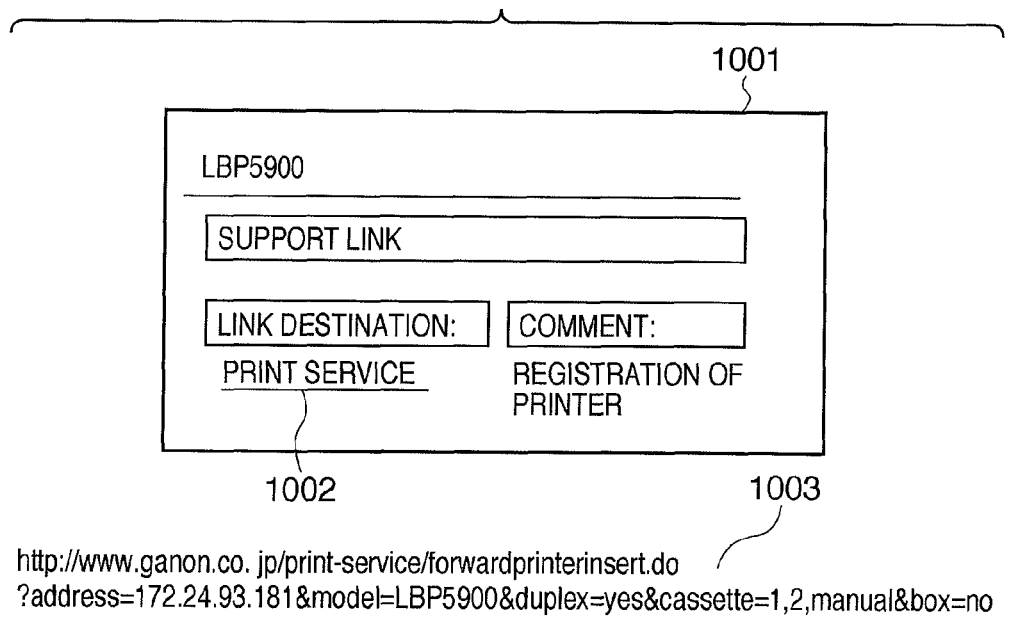
FIG. 10 is a view showing the dialog (screen) of a printer registration page to a print service according to the embodiment of the present invention.

FIG. 10 is a view showing the dialog (screen) of the printer registration page to the print service according to the embodiment of the present invention.

In step S704 of FIG. 7, the Web page generation unit 509 of the printing apparatus 106 creates the printer registration page 1001 to the print service and transmits it to the client terminal 105.

In the printer registration page 1001, the URL 1003 is an example of the URL of the printer registration page to the print service. As a parameter, printer configuration information collected by the configuration information collection unit 510 is set. The URL 1003 is embedded as the hyperlink 1002 in the printer registration page 1001 to the printer service. The user clicks the hyperlink 1002 on the Web browser 508 of the client terminal 105, thereby accessing the print server 104.

In the present invention, the user first accesses, via the Web browser 508, the printer registration page 1001 to the print service provided by the printing apparatus 106. As a method of accessing the printer registration page 1001 by the user, for example, the printer administrator of the local area mails the URL of the printer registration page. Alternatively, printer URLs may be listed on an in-house homepage accessible by the user.

FIG. 11 is a view showing the dialog (screen) of the user authentication page to the print service according to the embodiment of the present invention.

In step S806 of FIG. 8, the Web page generation unit 503 of the print server 104 transmits the user authentication page 1101 to the client terminal 105. The user enters, in input fields 1102 and 1103, the user name and password of an account registered in advance in the print service. Then, the user clicks a login button 1104, thereby transmitting a user authentication request to the print server 104. The user authentication request contains the input user name and password.

FIG. 12 is a view showing the dialog (screen) of the printer registration page for registering a printer in the print service according to the embodiment of the present invention.

In step S810 of FIG. 9, the Web page generation unit 503 of the print server 104 creates the printer registration page 1201 and transmits it to the client terminal 105.

The printer registration page 1201 reflects printer configuration information set as a parameter in the URL 1003. The user enters an arbitrary printer name in an input field 1203 and clicks an execution button 1202, thereby transmitting a printer registration request to the print server 104.

Figure 13:
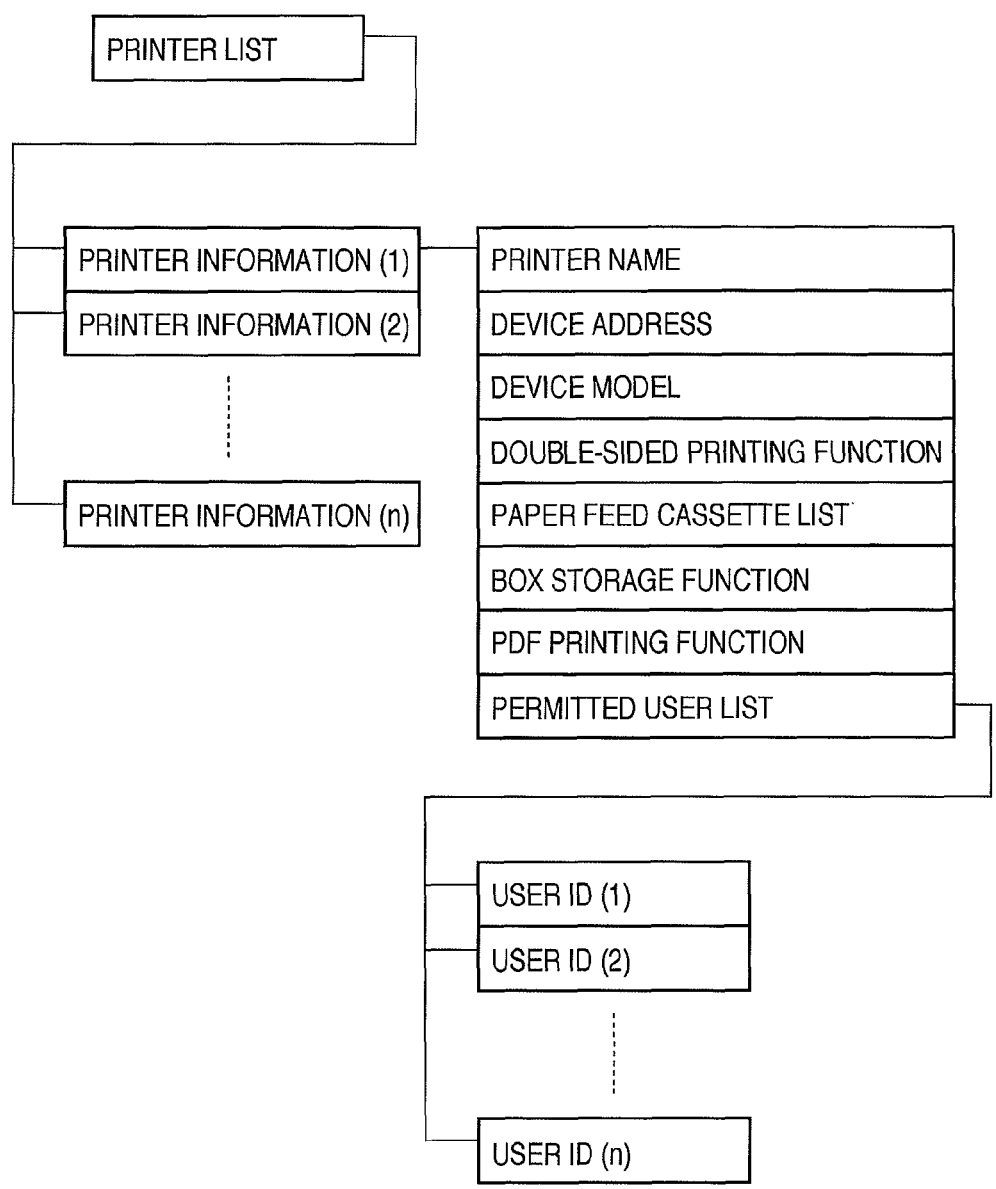
FIG. 13 is a view showing printer information registered in the print service according to the embodiment of the present invention.

FIG. 13 is a view showing printer information registered in the print service according to the embodiment of the present invention.

The printer information management unit 504 of the print server 104 holds the printer information. A printer list is made up of pieces of printer information. The printer information is formed from configuration information (e.g., device address, device model, the presence/absence of a double-sided printing function, paper feed cassette list, the presence/absence of a box storage function, and that of a PDF printing function), and a permitted user list. The permitted user list includes a plurality of user IDs. In step S815 of FIG. 9, the printer information management unit 504 creates the printer information and adds it to the printer list.

Figure 14:
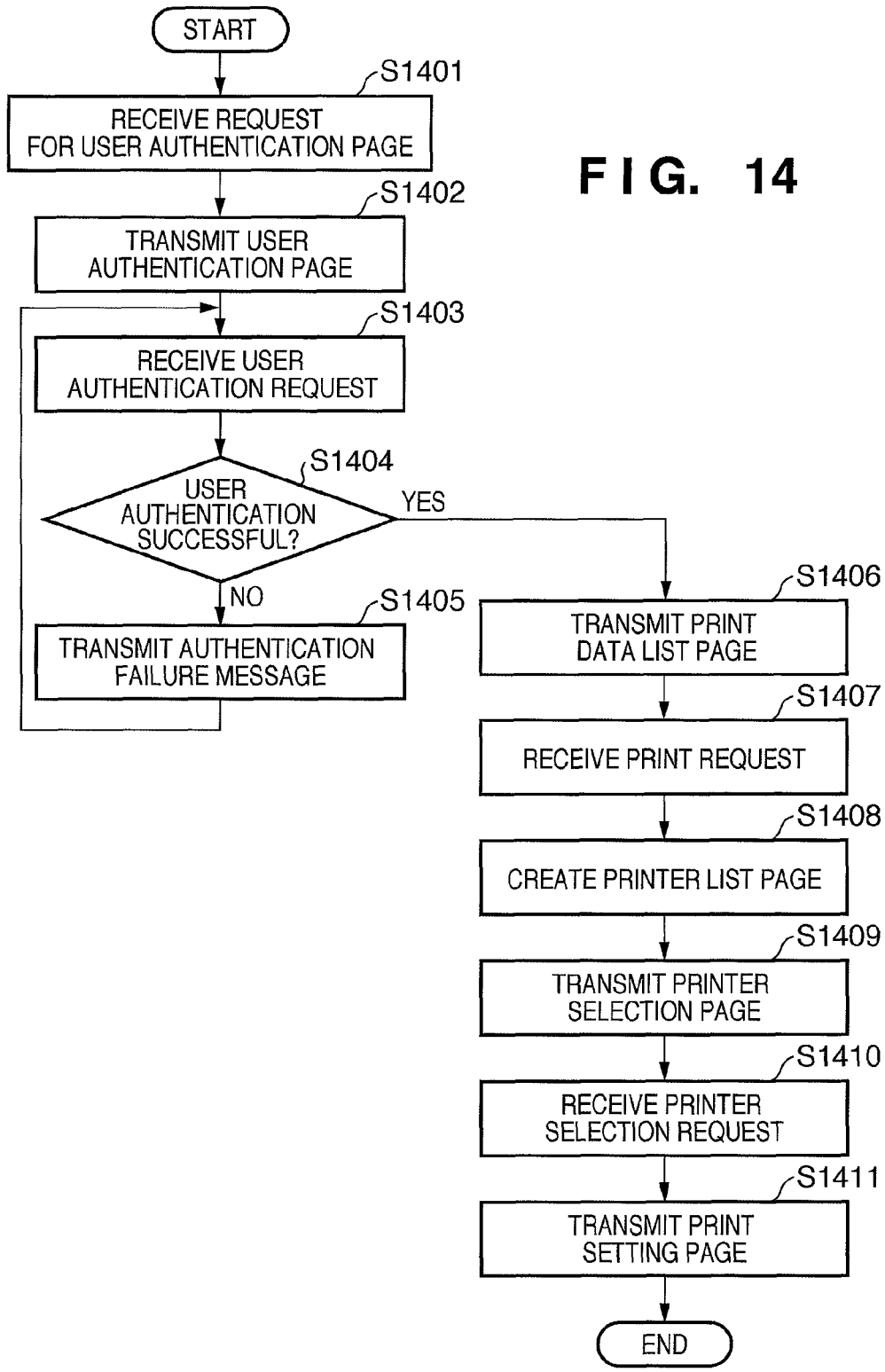
FIG. 14 is a flowchart showing the sequence of processing by the print server until a print setting page (print setting dialog (screen)) is displayed when printing by a printer registered in the print service according to the embodiment of the present invention.

FIG. 14 is a flowchart showing the sequence of processing by the print server until a print setting page (print setting dialog (screen)) is displayed when printing by a printer registered in the print service according to the embodiment of the present invention.

Print data to be printed by the user is assumed to have been downloaded by the print data acquisition unit 505 of the print server 104 and stored in the print data storage unit 507.

In response to a user instruction, the Web browser 508 of the client terminal 105 transmits a request to the print server 104 for the user authentication page 1101 in FIG. 11.

In step S1401, the Web page generation unit 503 receives the user authentication page request from the client terminal 105. In step S1402, the Web page generation unit 503 transmits the user authentication page to the client terminal 105.

In step S1403, the print server 104 receives a user authentication request from the client terminal 105. Then, the user authentication unit 501 executes user authentication based on user information managed by the user information management unit 502. By performing the user authentication, printing by a user who is not managed in the print service can be prevented.

In step S1404, the user authentication unit 501 determines whether the user authentication is successful. If the user authentication unit 501 determines that the user authentication has failed (NO in step S1404), the process advances to step S1405. In step S1405, the Web page generation unit 503 generates a Web page in which a message (authentication failure message) that the authentication has failed is embedded. The Web page generation unit 503 transmits the Web page to the client terminal 105, and then the process returns to step S1403.

If the user authentication unit 501 determines that the user authentication is successful (YES in step S1404), the process advances to step S1406. In step S1406, the Web page generation unit 503 creates a print data list page 1501 in FIG. 15, and transmits it to the client terminal 105. The print data list page represents print data of the user authenticated in step S1403 that is stored in the print data storage unit 507.

In step S1407, the print server 104 receives a print request for print data contained in the print data list page transmitted in step S1406. In step S1408, the printer information management unit 504 searches for a printer the use of which by the user authenticated in step S1403 is permitted and has a function of printing selected print data. The function of printing selected print data is, for example, the PDF printing function. The Web page generation unit 503 creates a printer list page, for example, printer selection page 1601 in FIG. 16 containing a list of printers having this function. In step S1409, the Web page generation unit 503 transmits the printer list page to the client terminal 105.

In this fashion, a printer that can be used by a user is searched for and a printer list page is created. This can prevent a print instruction to an unpermitted printer. Also, a printer having a function of printing selected print data (i.e., capable of printing the print data) is searched for and a printer list page is created. This can prevent a print instruction to a printer incapable of printing selected print data.

In step S1410, the print server 104 receives a printer selection request from the client terminal 105. Then, the Web page generation unit 503 creates a print setting page 1701 in FIG. 17 which reflects printer information of the selected printer. In step S1411, the Web page generation unit 503 transmits the print setting page to the client terminal 105.

As the reflected printer information, for example, when the printer has the double-sided printing function, double-sided printing is selectable as a printing method. When the printer does not have the box storage function, an item for designating box storage is not displayed. Further, only a cassette in the paper feed cassette list is selectable as a paper feed unit. By creating a print setting page reflecting the printer information, setting of a print attribute unavailable in a selected printer can be prevented.

Figure 15:
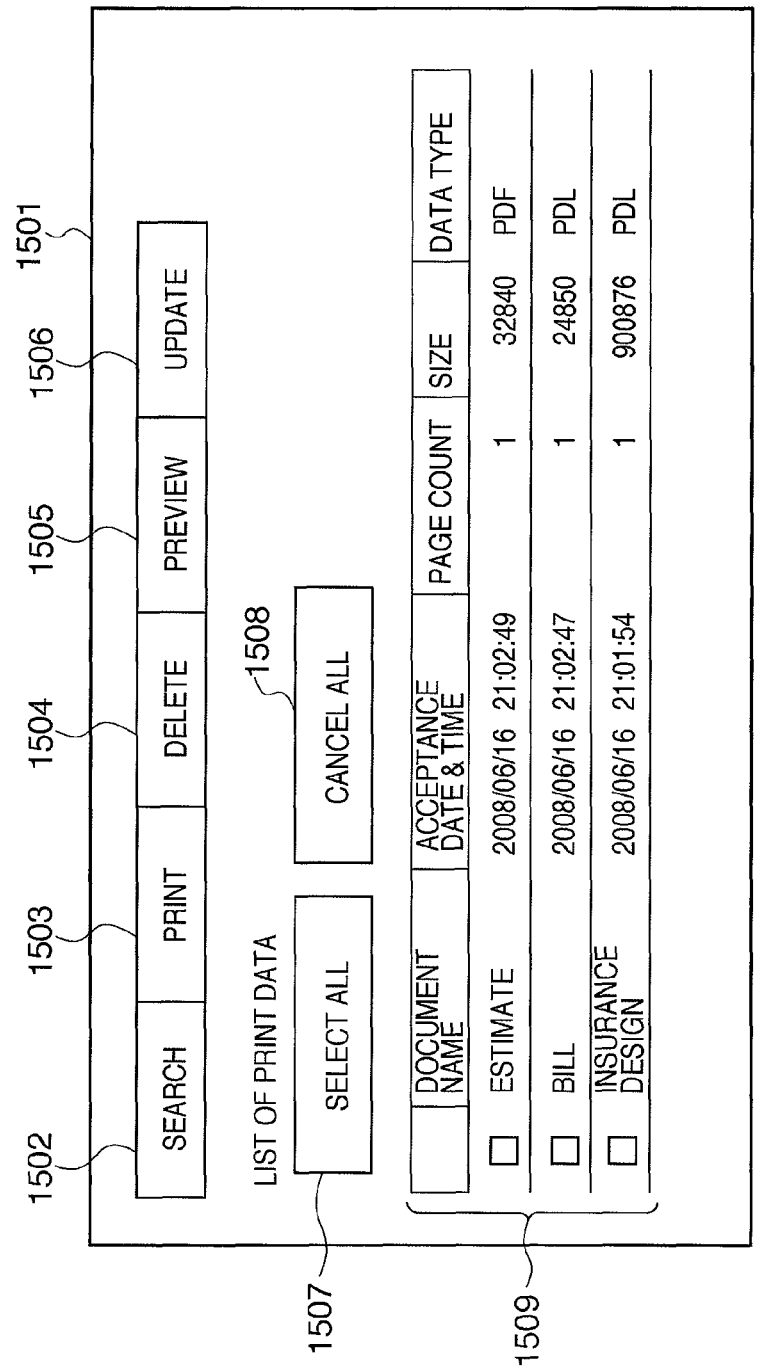
FIG. 15 is a view showing the dialog (screen) of a print data list page for selecting print data stored in the print service according to the embodiment of the present invention.

FIG. 15 is a view showing the dialog (screen) of the print data list page for selecting print data stored in the print service according to the embodiment of the present invention.

In step S1406 of FIG. 14, the Web page generation unit 503 creates the print data list page 1501 based on print data of a user that is stored in the print data storage unit 507.

A search button 1502 is used to search for print data. A print button 1503 is used to designate printing of selected target print data. A delete button 1504 is used to delete registered printer information. A preview button 1505 is used to display the print preview of selected target print data.

An update button 1506 is used to update the contents of a print data list 1509. A button 1507 is used to select all displayed print data. A button 1508 is used to cancel selection of all displayed print data.

The user selects target print data from the displayed print data list 1509 and clicks the print button 1503, thereby transmitting a print request for the print data to the print server 104.

Figure 16:
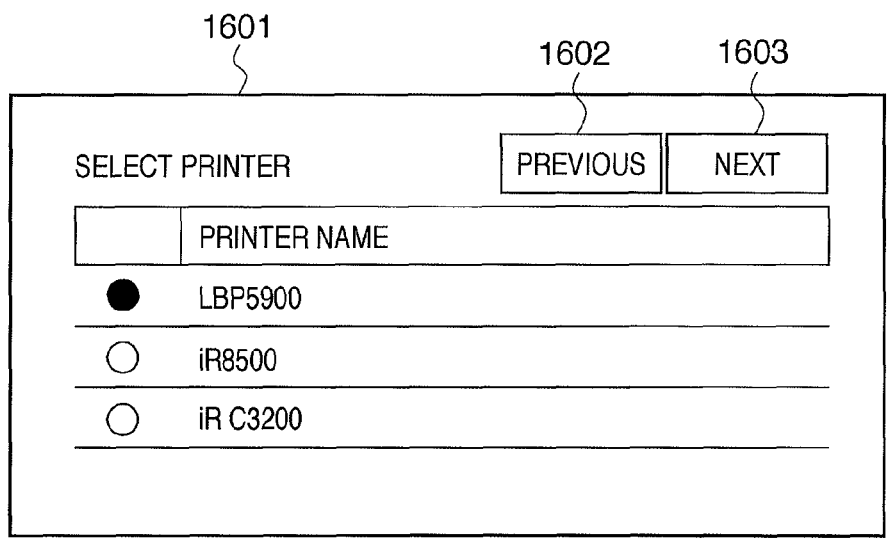
FIG. 16 is a view showing the dialog (screen) of a printer selection page for selecting a printer to execute printing of print data according to the embodiment of the present invention.

FIG. 16 is a view showing the dialog (screen) of the printer selection page for selecting a printer to execute printing of print data according to the embodiment of the present invention.

A printer selection page 1601 appears when the user clicks the print button 1503 on the print data list page 1501 in FIG. 15. In step S1408 of FIG. 14, the Web page generation unit 503 creates a list of printers that can be used by a user, and transmits the printer selection page 1601 to the client terminal 105.

The client terminal 105 can select a desired printer from the list of printers usable for printing that is described in the printer selection page 1601. In the example of FIG. 16, the list is formed from radio buttons and allows selecting only one printer.

When the user clicks a previous button 1602, the dialog (screen) returns to that of FIG. 15. When the user clicks a next button 1603, a printer selection request for selecting a selected printer is transmitted to the print server 104.

Figure 17:
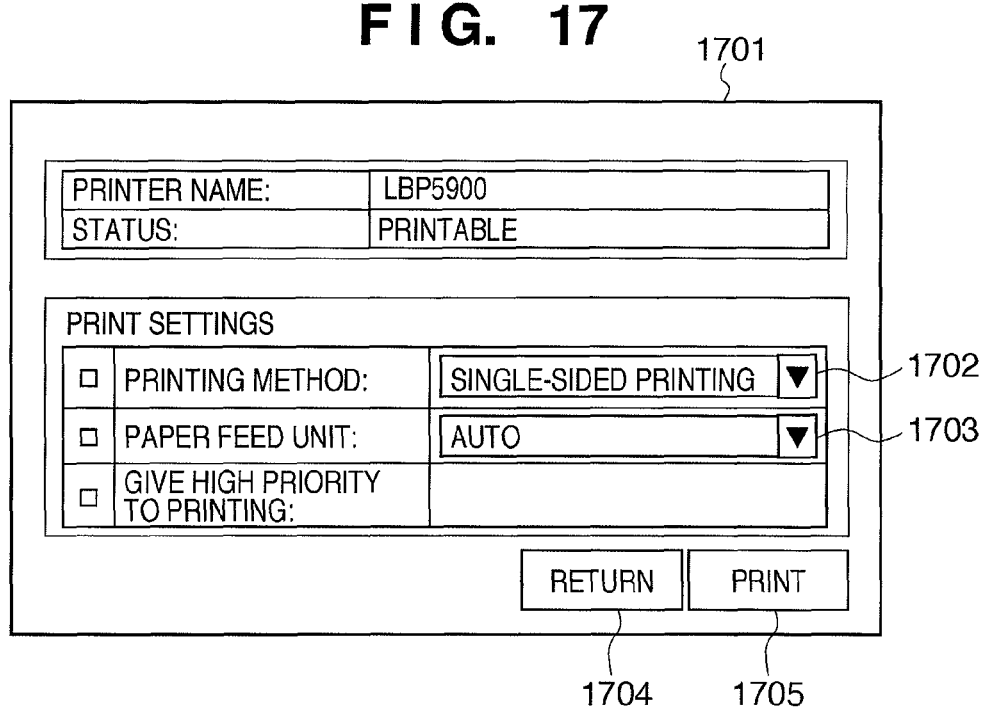
FIG. 17 is a view showing the dialog (screen) of a print setting page for setting a print attribute in printing according to the embodiment of the present invention.

FIG. 17 is a view showing the dialog (screen) of the print setting page for setting a print attribute in printing according to the embodiment of the present invention.

A print setting page 1701 appears when the user clicks the next button 1603 in FIG. 16. In step S1410 of FIG. 14, the Web page generation unit 503 creates the print setting page 1701 so as to reflect selected printer information, and transmits it to the client terminal 105.

The print setting page 1701 contains print setting input controls in addition to display of the printer name and current printer status.

Combo boxes 1702 and 1703 are used to select a printing method and paper feed unit. The user can select an arbitrary printing method and paper feed unit from lists registered in the respective combo boxes. When the user clicks a return button 1704, the dialog (screen) returns to that of FIG. 16. When the user clicks a print button 1705, a print setting request is transmitted to the print server 104.

Figure 18:
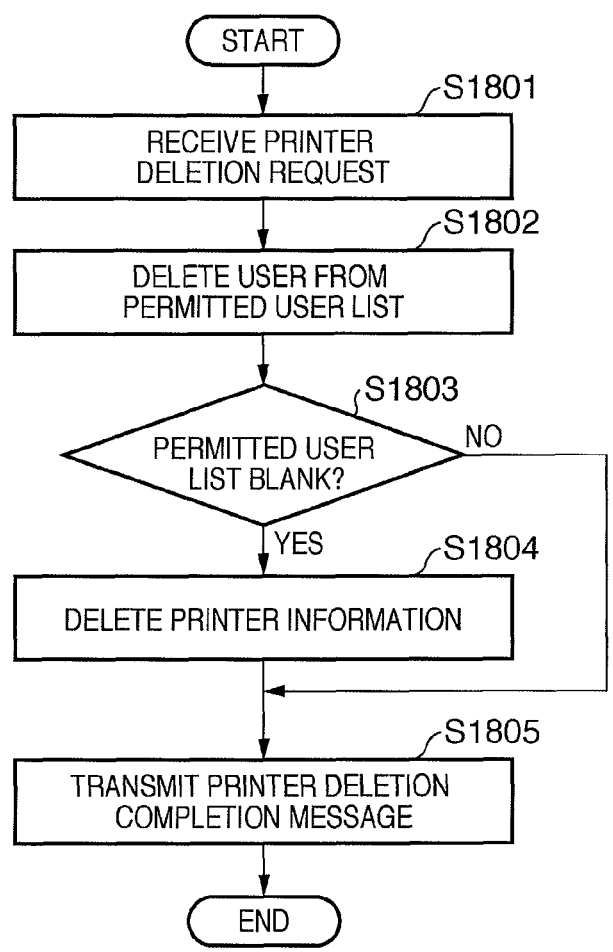
FIG. 18 is a flowchart showing the sequence of processing by the print server in printer deletion processing according to the embodiment of the present invention.

FIG. 18 is a flowchart showing the sequence of processing by the print server in printer deletion processing according to the embodiment of the present invention.

The printer deletion processing is to delete (cancel registration) printer information managed by the printer information management unit 504. In this processing, for example, the user first clicks the delete button 1504 of the print data list page 1501. Then, the printer selection page 1601 in FIG. 16 appears. When the user clicks the next button 1603, a printer deletion request for deleting a selected printer is transmitted to the print server 104.

In step S1801, the print server 104 receives a printer deletion request from the client terminal 105. In step S1802, the printer information management unit 504 deletes, from the permitted user list in printer information, the user ID of a user who has transmitted the request.

In step S1803, the printer information management unit 504 determines whether the permitted user list is blank. If the printer information management unit 504 determines that the permitted user list is not blank (NO in step S1803), the process advances to step S1805. If the printer information management unit 504 determines that the permitted user list is blank (YES in step S1803), it deletes the printer information in step S1804.

In step S1805, the Web page generation unit 503 generates a page in which a message (printer deletion completion message) that deletion of the printer is complete is embedded. The Web page generation unit 503 transmits the page to the client terminal 105.

In this manner, the user can delete a printer registered in the print service.

As described above, according to the embodiment, printer configuration information can be easily registered in a service (server) which provides the printing function in the Internet & thin client environment, like SaaS.

The embodiment can provide a print system, a print server, a control method thereof, and a program capable of easily, safely registering printer configuration information in a service provider in an environment in which a service for providing the printing function is utilized.

In the embodiment, the user authentication unit, user information management unit, Web page generation unit, printer information management unit, print data acquisition unit, print data conversion unit, and print data storage unit of the print server are arranged in one server machine. However, it is also possible to arrange these units in a plurality of server machines which cooperate with each other. The load may be distributed by sharing the user information management unit, printer information management unit, and print data storage unit in a shared server and clustering the remaining units in a plurality of server machines.

In the embodiment, the print service manages user information and performs user authentication. However, with the use of an external authentication service, the print service itself may omit the user authentication unit and user information management unit.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-001108, filed Jan. 6, 2009, which is hereby incorporated by reference herein in its entirety.

What is claimed is:

1. A system which is configured by a client terminal including a web browser, a printer, and a print server for providing print data generated on the basis of data acquired by an external service to the printer, the system comprising:
a reception unit constructed to receive from the web browser included in the client terminal a registration request for registering information of the printer to the print server;
a transmission unit constructed to transmit, in response to reception of the registration request by said reception unit, the information of the printer associated with user information input via a user authentication screen transmitted from the print server to the client terminal; and
a printing unit constructed to print data, after the print data is received, which is provided by the print server in response to designation for causing the printer to print the data,
wherein a print setting screen of a printer selected via a printer list is provided by the print server, after the user information is associated with the information of the printer.

2. The system according to claim 1, wherein the web browser included in the client terminal receives an instruction for registering the printer to the printer server, input from a user.

3. A printer which can communicate with a client terminal including a web browser and a print server for providing print data generated on the basis of data acquired by an external service to the printer, the printer comprising:
a reception unit constructed to receive from the web browser included in the client terminal a registration request for registering information of the printer to the print server; and
a transmission unit constructed to transmit, in response to reception of the registration request by said reception unit, the information of the printer associated with user information input via a user authentication screen transmitted from the print server to the client terminal;
wherein a print setting screen of a printer selected via a printer list is provided by the print server, after the user information is associated with the information of the printer.

4. The printer according to claim 3, wherein the web browser included in the client terminal receives an instruction for registering the printer to the printer server, input from a user.

5. A client including a web browser, which can communicate with a printer and a print server for providing print data generated on the basis of data acquired by an external service to the printer, the client comprising:
a first transmission unit constructed to transmit a registration request for registering information of the printer to the print server from the web browser to the printer, wherein the web browser displays a user authentication transmitted from the print server to the client; and
a second transmission unit constructed to transmit user information input via a user authentication screen displayed by the web browser from the web browser to the print server;
wherein the printer transmits, in response to reception of the registration request transmitted by said first transmission unit, the information of the printer associated with user information to the print server, and
wherein a printing setting screen of a printer selected via a printer list is provided by the print server, after the user information transmitted by said second transmission unit is associated with the information of the printer.

6. A control method of a client including a web browser, which can communicate with a printer and a print server for providing print data generated on the basis of data acquired by an external service to the printer, the method comprising:
- a first transmission step of transmitting a registration request for registering information of the printer to the print server from the web browser to the printer, wherein the web browser displays a user authentication transmitted from the print server to the client; and
- a second transmission step of transmitting user information input via a user authentication screen displayed by the web browser from the web browser to the print server;
- wherein the printer transmits, in response to reception of the registration request transmitted in said first transmission step, the information of the printer associated with user information to the print server, and
- wherein a printing setting screen of a printer selected via a printer list is provided by the print server, after the user information transmitted in said second transmission step is associated with the information of the printer.

7. A non-transitory computer-readable storage medium storing, in executable form, a program for causing a computer to a client including a web browser, which can communicate with a printer and a print server for providing print data generated on the basis of data acquired by an external service to the printer, the program causing the computer to:
- transmit a registration request for registering information of the printer to the print server from the web browser to the printer, wherein the web browser displays a user authentication transmitted from the print server to the client; and
- transmit user information input via a user authentication screen displayed by the web browser from the web browser to the print server;
- wherein the printer transmits, in response to reception of the registration request, the information of the printer associated with user information to the print server, and
- wherein a printing setting screen of a printer selected via a printer list is provided by the print server, after the user information is associated with the information of the printer.

* * * * *